(12) United States Patent
Nerl

(10) Patent No.: US 6,591,372 B1
(45) Date of Patent: Jul. 8, 2003

(54) ZERO CLOCK SKEW COMPUTER MODULE

(75) Inventor: John Nerl, Londonderry, NH (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/392,599

(22) Filed: Sep. 9, 1999

(51) Int. Cl.$^7$ ................................................ G06F 1/10
(52) U.S. Cl. ...................... 713/503; 713/500; 713/503; 713/600
(58) Field of Search ................................ 713/500, 503, 713/600

(56) References Cited

U.S. PATENT DOCUMENTS

| | | | | |
|---|---|---|---|---|
| 5,257,294 A | * | 10/1993 | Pinto et al. ..................... | 331/1 |
| 5,347,232 A | * | 9/1994 | Nishimichi ..................... | 331/1 |
| 6,003,118 A | * | 12/1999 | Chen .......................... | 711/167 |
| 6,047,383 A | * | 4/2000 | Self et al. .................... | 703/503 |
| 6,112,308 A | * | 8/2000 | Self et al. .................... | 713/400 |

* cited by examiner

Primary Examiner—Thomas Lee
Assistant Examiner—Nitin Patel
(74) Attorney, Agent, or Firm—Cesari and McKenna, LLP

(57) ABSTRACT

The length of the phase lock feedback path of the phase lock loop chip (PLL chip) is adjusted so that the timing of clock pulses at computer chips is measured relative to the arrival time of a clock pulse at the computer board clock pin. This adjustment of the length of the phase lock loop accounts for the length of the trace from the computer board clock pin to the PLL clock input pin. This adjustment of the length of the phase lock loop removes uncertainty between vendors in the arrival time of clock pulses at the computer chips, relative to arrival time of clock pulses at the computer board clock pin. A system designer then has control of the arrival time of a pulse at a computer chip clock pin by adjustment of the arrival time of the clock pulse at the computer board clock pin, and no variation is introduced between vendors who adopt the invention in their design of computer boards.

13 Claims, 5 Drawing Sheets

ZERO CLOCK SKEW COMPUTER MODULE

FIELD OF THE INVENTION

This invention relates to timing of chips on a computer board, and more specifically to timing of memory chips on a memory board.

BACKGROUND OF THE INVENTION

A computer board receives a timing pulse from a wire carrying a train of clock pulses. The wire is oftentimes a conductor associated with a bus with which the computer board is connected, oftentimes with the computer board being plugged into a connector. The connector is oftentimes an integral part of the bus. The wire, or bus conductor, is often a conducting trace made as part of the motherboard of the computer. The conducting traces of the bus may be made on the motherboard of the computer by etching, etc.

A computer board normally has pins along at least one side of the board. The pins make contact with conductors within a connector of the bus. The connector is oftentimes made integral with the etched traces of the bus. The etched traces of the bus and the connectors to the bus are then an integral part of the motherboard of the computer. When the computer board is plugged into the connector, the clock pulses carried by the clock trace of the bus are received by a pin along the edge of the computer board, the computer board clock pin. Timing of clock pulses at memory chips on memory boards of a computer is critical in order to have memory read and write operations work without failures. Further, computer boards which serve as memory boards have chips which serve as buffers and which serve as registers. Timing of pulses at register chips, buffer chips, and the memory chips are critical to proper functioning of memory read and write operations in the computer. The following discussion applies to all types of computer boards. However, the discussion will focus on memory boards as an example, since clock pulse timing is critical on memory boards.

The clock input pin to a memory board is referred to as the "memory board clock pin". The memory board clock pin must be connected to the various chips mounted on the memory board. This connection is oftentimes made by traces, or conducting paths etched into the computer board, or into the memory board. Variations in length of the traces etched into the memory board cause variations in the time difference between arrival of a clock pulse at the memory board clock pin, and arrival of a clock pulse at a chip mounted on the memory board. Propagation speeds of 100 to 200 picoseconds per inch along a trace in a memory board are typical. Thus a ¼ inch difference in path length from a clock pin to a first chip and from the clock pin to a second chip can result in a timing difference of from 25 picoseconds to 50 picoseconds. Such timing differences are significant in the operation of computers operating with clocks of several hundred megahertz, and must be eliminated or accounted for in the computer system design. For example, a computer operating with a clock speed of 100 megahertz on the bus has a cycle time of $10^{**}(-8)$ seconds, or 10,000 picoseconds. In the event that random timing errors between memory chips of 25 to 50 picoseconds are introduced by a manufacturer into a system operating with a bus clock speed of 10,000 picoseconds per cycle (100 megahertz), or for example, 5,000 picoseconds per cycle (500 megahertz), the timing errors may be sufficiently large to cause memory store and read operations to fail.

It is standard engineering practice to include a phase lock loop (PLL) chip on a memory board to adjust timing of clock pulses reaching memory chips on the board. The input of the PLL chip is driven by a clock pulse received from the memory board clock pin. The output of the PLL chip is connected by traces which all have the same length to a plurality of memory chips on the memory board. For example, a memory board with eight memory chips will have traces from the output pin of the PLL chip to each of the input clock pins of each memory chip. And the traces from the PLL output pin to the input clock pins of the memory chips are typically designed to be the same length. Having the traces the same length insures that the clock pulses reach each memory chip at the same time, to within any variation in trace length introduced by the manufacturing process. Variation in trace length introduced by a particular vendor's manufacturing processes is usually insignificant.

A timing difference between the arrival time of a clock pulse at the clock input pin of the PLL chip and the time that a pulse is output on the output pin of the PLL chip is adjusted by the length of a feedback path. The feedback path typically originates at a feedback origin pin, and terminates on a feedback termination pin of the PLL chip. It is standard engineering practice to adjust the length of the feedback path, and thus the delay of the output pulse of the PLL chip, so that clock pulses reach the memory chips at a fixed time relative to the arrival time of the clock pulse at the input pin of the PLL chip. For example, the feedback loop is normally adjusted to provide a fixed timing relationship of the clock pulse at the memory chip to the time that a corresponding clock pulse reaches the input pin of the PLL chip.

The length of the trace from the clock pin of the memory board to the clock input pin of the PLL chip determines the delay from the arrival time of the clock pulse at the bus connector into which the memory board is plugged, and the arrival time of the pulse at the PLL chip. One vendor of memory boards may make this trace from the memory board clock pin to the PLL clock input pin one length, and another vendor may make this trace another length. The variation in length of the trace from the memory board clock pin to the PLL clock input pin from one vendor to another vendor introduces delay variation between vendors for the arrival time of clock pulses at memory chips. Thus, if a bus of a computer is populated with memory boards made by different vendors, the clock pulses may reach the memory chips on the various memory boards at different times. The time differences are reckoned by the pulse propagation velocity along a board trace combined with the length differences, and propagation velocities may be between, for example, 100 picoseconds per inch and 200 picoseconds per inch. Typical differences in vendor's trace lengths between the board clock pin and the PLL input pin may be sufficient for the timing variations at the memory chips to cause memory read or write errors.

There is needed a way to eliminate variation of clock pulse timing at memory chips caused by different vendors using different trace lengths, so that a bus in a computer may be populated with memory boards made by different vendors.

SUMMARY OF THE INVENTION

The invention adjusts the length of the feedback trace of the phase lock loop of he PLL chip so that the timing of clock pulses at memory chips is measured relative to he arrival time of a clock pulse at the memory board clock pin. This adjustment of the length of the feedback loop accounts for the length of the trace from the memory board clock pin to the PLL clock input pin. This adjustment of the length of the feedback loop removes uncertainty between vendors in the arrival time of clock pulses at the memory chips, relative to arrival time of clock pulses at the memory board clock pin. A system designer then has control of the arrival time of a pulse at a memory chip clock pin by adjustment of the arrival time of the clock pulse at the memory board clock pin, and no variation is introduced between vendors who adopt the invention in their design of memory boards.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views FIG. 1 of a memory board of a computer.

DETAILED DESCRIPTION OF AN ILLUSTRATIVE EMBODIMENT

Figure 1:
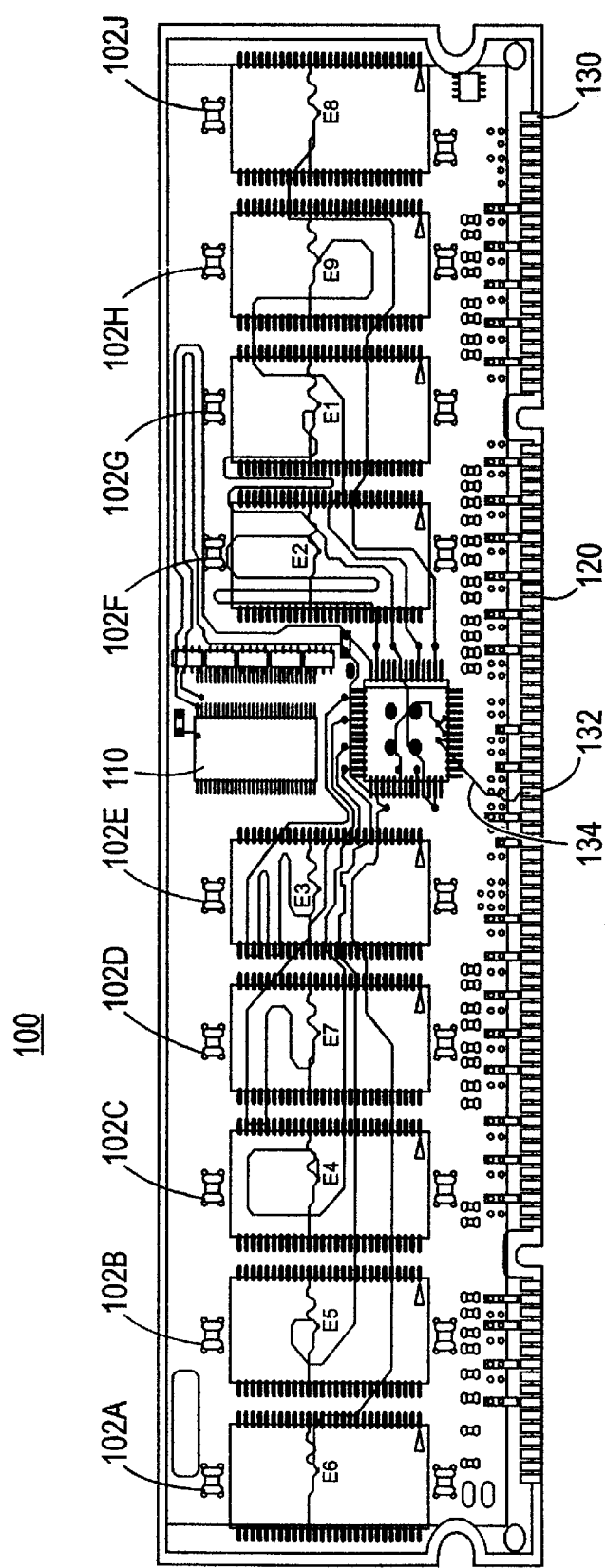

Turning now to FIG. 1, board 100, which is a memory board of a computer, is shown. Memory chips 102A–102J form part of the memory of the computer. Phase lock loop (PLL) chip 120 provides timing signals for board 100. Pins 130 plug into a connector, where the connector is part of the bus of the computer.

Pin 132 is the memory board clock pin. A conductor in the bus of the computer carries clock pulses, and pin 132 connects to the conductor carrying clock pulses. Pin 132 connects by trace 134 to phase lock loop chip 120. Trace 134 is a conductor made in memory board 100, for example by etching.

Figure 2:
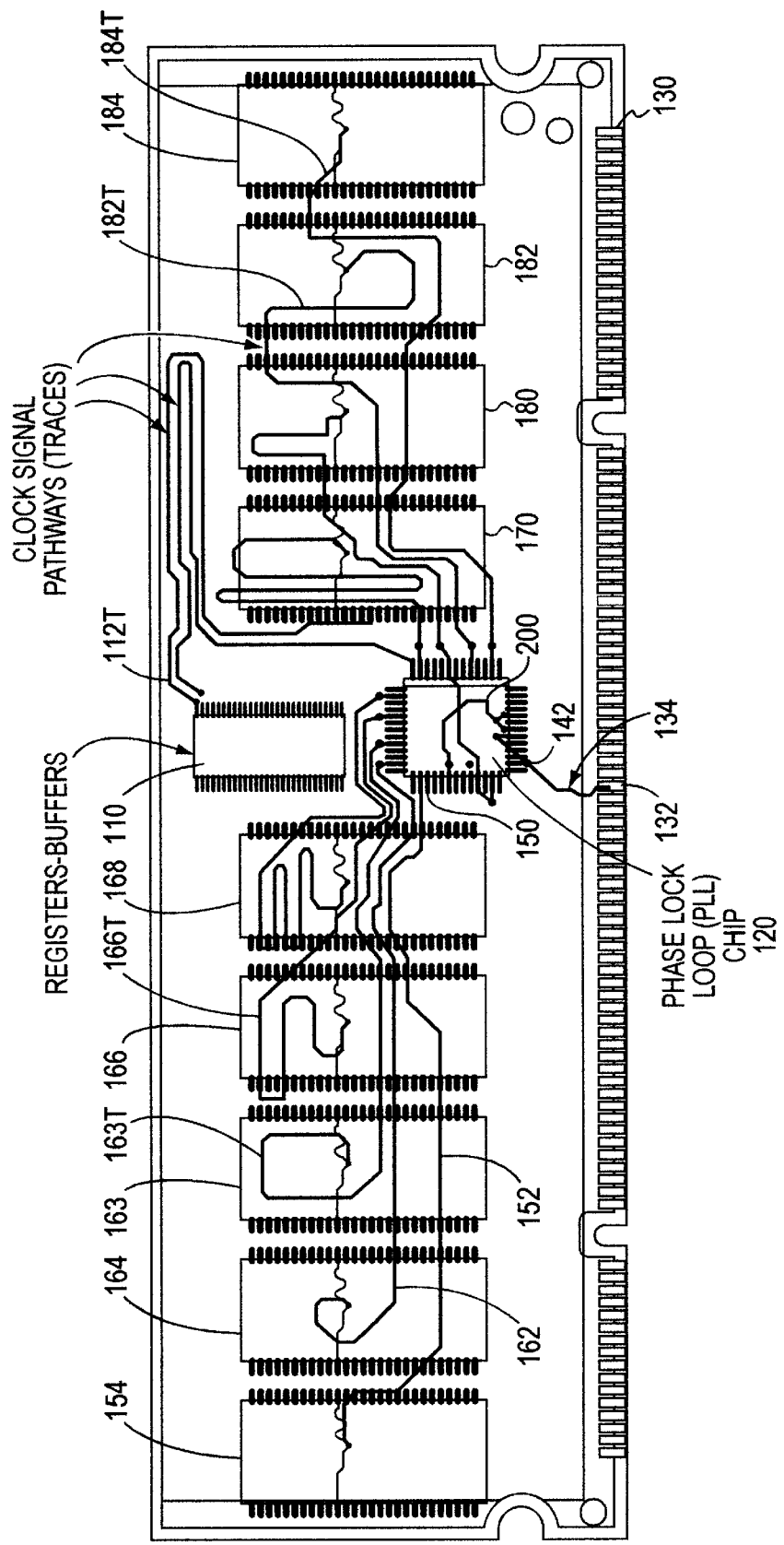
FIG. 2 is a block diagram of a memory board of a computer showing timing traces on the board.
Figure 3:
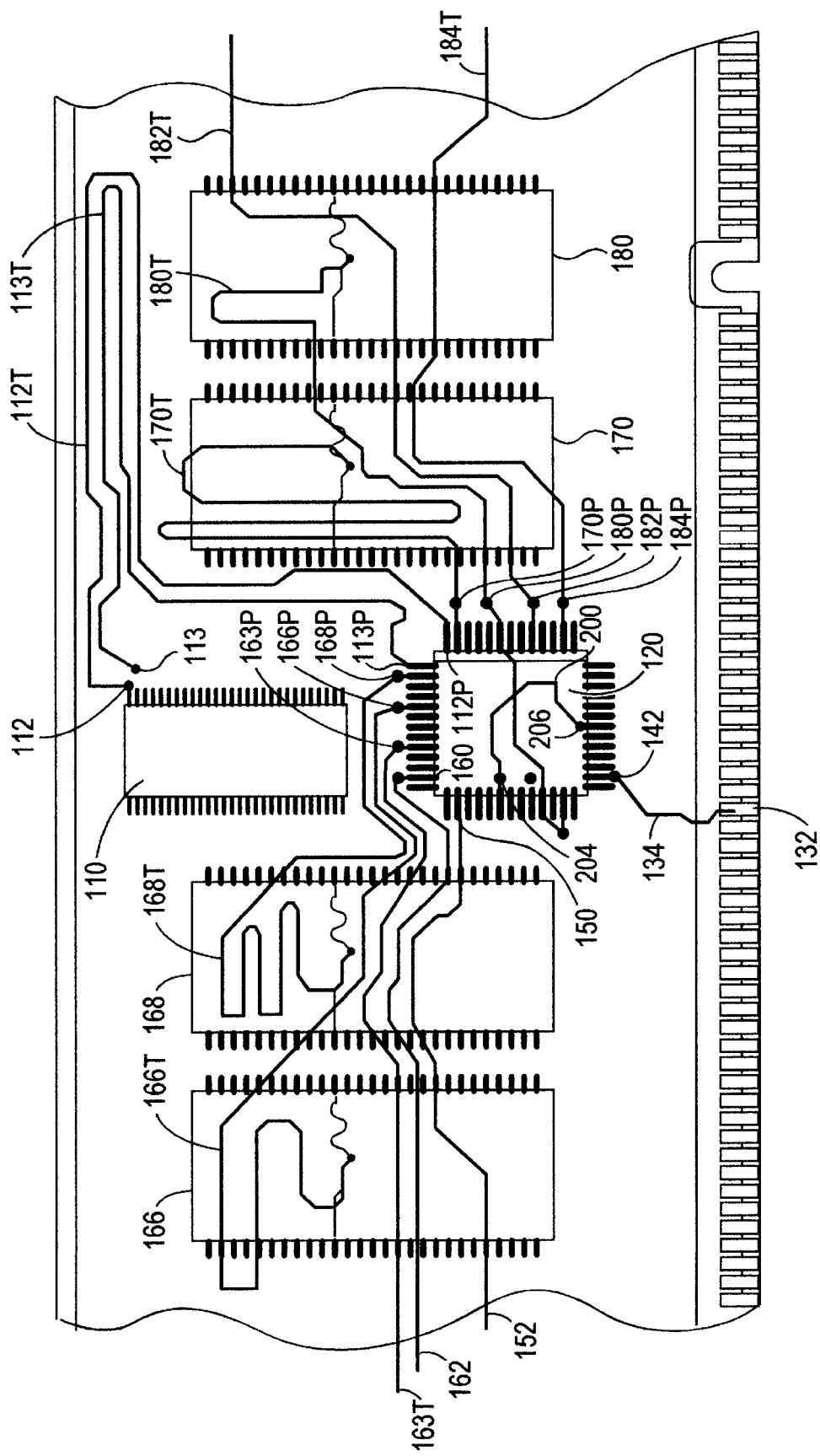
FIG. 3 is an enlargement of a center section of FIG. 2.

Turning now to FIG. 2, the clock pulse traces of the memory board 100 are shown. Pin 132 is the memory board clock pin. Trace 134 connects memory board clock pin 132 to input clock input pin 142 of phase lock loop chip 120. Phase lock loop chip 120 has a number of output pins; and these output pins are all internally connected as a single pin within phase lock loop chip 120. Details of connections on memory board 100 are shown in FIG. 3.

Output pin 150 connects by trace 152 to pins of memory chip 154. Pin 160 of phase lock loop chip 120 connects by trace 162 to pins of memory chip 164. Similarly, each memory chip connects by a trace to a respective output pin of phase lock loop chip 120. For example, phase lock loop chip output pin 163P connects by trace 163T to memory chip 163. Memory chip 166 connects by trace 166T to output pin 166P of phase lock loop chip 120.

Memory chip 168 connects by trace 168T to output pin 168P of phase lock loop chip 120. Memory chip 170 connects by trace 170T to output pin 170P of phase lock loop chip 120. Memory chip 180 connects by trace 180T to output pin 180P of phase lock loop chip 120. Memory chip 182 connects by trace 182T to output pin 182P of phase lock loop chip 120. And finally, memory chip 184 connects by trace 184T to output pin 184P of phase lock loop chip 120.

Each of the traces connecting an output pin of phase lock loop chip 120 to a memory chip, such as trace 152, trace 162, trace 163T, trace 166T, trace 168T, trace 170T, trace 180T, trace 182T, and trace 184T are all the same length. By making each of the traces from phase lock loop chip 120 to the various memory chips the same length permits the clock pulse generated by phase lock loop chip 120 on its various output pins to reach each of the memory chips at the same time. The equal length of the traces and the design of equal propagation speeds for the pulse on the traces, permit the arrival of pulses at each of the memory chips at the same time.

Memory chips 154, 164, 163, 166, 168, 170, 180, 182, 184, etc. may represent any type of computer chip for which it is desired to connect clock pulses. The following description of adjustment of the length of the feedback loop 200 of phase lock loop chip 120 so that timing of pulses at the chips 154 . . . 184 etc. is relative to board input clock pin 132 applies to all types of computer chips 154 . . . 184, etc.

The time that a pulse arrives at a memory chip relative to the time that a pulse arrives at clock input pin 142 of phase lock loop chip 120 is adjustable by the adjustment of the length of a feedback loop 200 connecting two pins of phase lock loop chip 120. Feedback loop 200 connects to feedback origin pin 204, and to feedback termination pin 206. The length of feedback loop 200 determines the time difference between the arrival of a pulse at phase lock loop chip clock pin 142 and the occurrence of the corresponding pulse on the output pins of phase lock loop chip 120. For example, in many designs in phase lock loop chips, if the feedback loop 200 is made equal to the trace lengths from an output pin of phase lock loop chip 120 to a downstream chip, then the pulse reaches an input pin on the downstream chip at the same time that the corresponding pulse reaches the clock input pin of phase lock loop chip 120. In the present design, the "downstream chip" is each of the memory chips. And alternatively, the "downstream chip" may be any computer chip for which it is desired to connect clock pulses.

That is, the nature of a phase lock loop chip permits adjustment of the arrival time of the pulse at memory chips relative to the arrival time of a pulse at the clock input pin 142 of the phase lock loop chip 120. The adjustment is made by adjusting the length of feedback loop 200.

An example of a calculation of the length of the feedback loop 200 of the phase lock loop chip 120 is given below. In the calculation a desired delay between arrival of a pulse at the input pin 132 of the memory card and the arrival time of a corresponding pulse at a memory chip is included. For example, a desired delay of 600 picoseconds is included in the calculation.

It is a desired object of the present invention to make the arrival time of a pulse at an input pin to a memory chip occur at a desired time relative to memory board clock pin 132. Accordingly, the length of trace 134 connecting memory board clock pin 132 to the clock input pin 142 of phase lock loop chip 120 is taken into account in the design of the length of phase lock loop trace 200. In standard designs of memory boards, traces are prepared which have a signal propagation velocity of approximately 100 picoseconds per inch to 200 picoseconds per inch.

Design of the length of the phase lock loop feedback path can be approached by use of the following expression:

> Length of phase lock loop feedback path=length of trace to memory chip−(minus) desired delay (in picoseconds) divided by propagation velocity+(plus) length of trace from memory board clock input pin to PLL clock input pin.
>
> L(PLL)=L(Trace to M Chip)−(Desired Delay)/(Propagation Velocity)+L(Trace from M board clock input pin to PLL clock input pin)

L(PLL) is the length of the phase lock loop feedback path.
L(Trace to M Chip)=5 inches.
L(Trace from M board clock input pin to PLL chip clock input pin)=1 inch.
Desired Delay=600 picoseconds.
Propagation Velocity=180 picoseconds/inch.

> Length of phase lock loop feedback path=5 inch−600 ps/(180 ps/inch)+1.0 inch.
>
> Length of PLL feedback path=5 inch−3.33 inch+1.0 inch.

Length of PLL feedback path=2.67 inch

In this example the length of the trace from phase lock loop chip 120 to any of the memory chips is five (5) inches. It is desired to introduce a delay of 600 picoseconds between the arrival time of a clock pulse at memory board clock input pin 132 and the arrival of the pulse at the pins of a memory chip, and in this example the delay is set at 600 picoseconds. The propagation velocity of a signal on trace 134 connecting memory board clock input pin 132 to the clock input pin of phase lock loop chip 120, and also the propagation velocity of a pulse on a trace connecting an output pin of PLL chip 120 to a computer chip is taken, in this example, to be 180 picoseconds per inch. The length of the trace from memory board clock input pin 132 to the clock input pin of the phase lock loop chip is taken as 1.0 inch.

Accordingly, in the above example, the length of the phase lock loop is computed to be 2.67 inches.

Register chip 110 has clock input pin 112. A second register chip has clock input pin 113. For example, there may be two register chips, chip 110 above the board 100, and a second register chip below the board (and so not visible in FIG. 3). Pin 112 of register chip 110 connects to phase lock loop chip output pin 112P by clock trace 112T. Pin 113, of another register chip, connects to phase lock loop chip output pin 113P by clock trace 113T. The lengths of clock trace 112T and clock trace 113T are adjusted to provide different arrival times, as desired, of pulses at pin 112 and pin 113 of the register chips.

Figure 4:
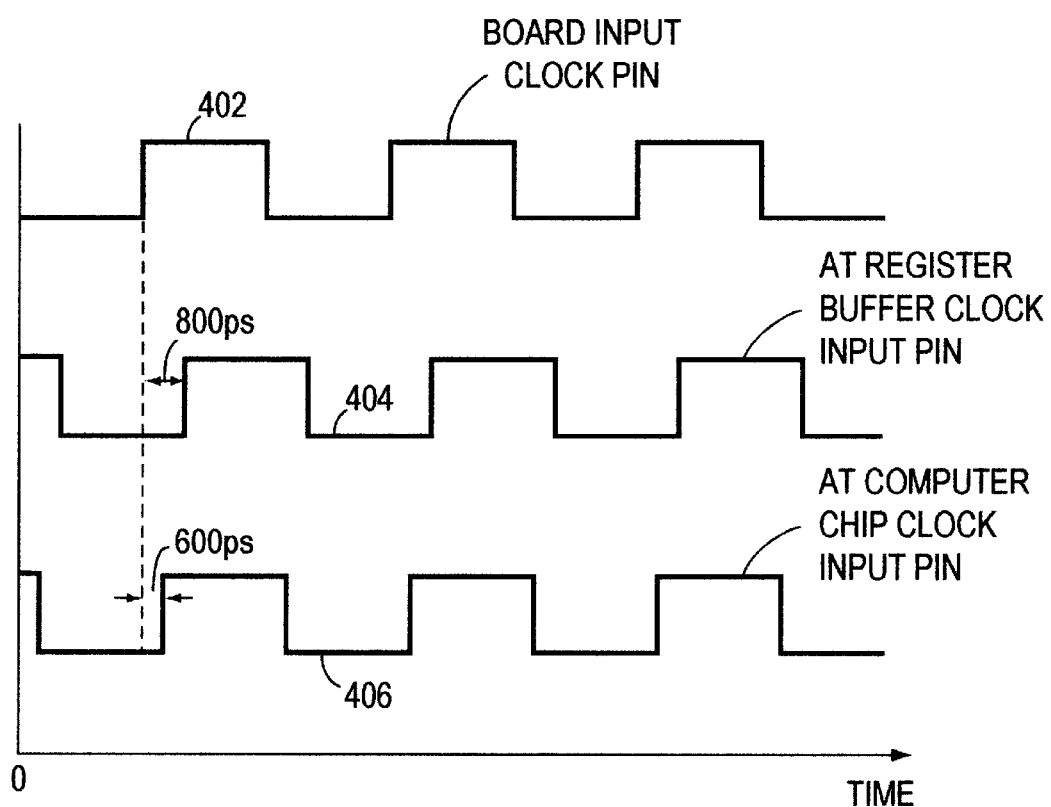
FIG. 4 is a graph showing timing pulses.

Turning now to FIG. 4, an exemplary timing sequence of clock pulses on a memory board are shown. The timing sequence gives the arrival times of pulses at desired locations on the memory board 100. Clock pulse trace 402 is the timing pulse as clock pulses arrives at memory board input clock pin 132. Trace 404 is delayed 800 picoseconds, and is the timing pulse for the input pin to register buffer 10. Clock trace 406 is the timing pulse that arrives at memory chips, such as memory chips 154, 164, 166, 168, 170, 180, and 182. Clock pulse trace 406 is delayed 600 picoseconds from clock trace 402 at memory board clock pin 132, and therefore reaches memory chips by 200 picoseconds before the clock pulse reaches register chip 110. This timing difference is typical engineering design for operation of memory chips and register chips on a memory board 100.

The length of PLL feedback loop 200 is adjusted so that the arrival time of pulse train 404 at register chip 110, and the arrival time of train 406 reaches memory chips, both arrival times being relative to the arrival time of a clock pulse from the bus at memory board clock input pin 132.

By accounting for the length of trace 134, connecting from memory board clock pin 132 to phase lock loop input clock pin 142, in designing the length of phase lock loop 200, arrival times of pulses at various chips on memory board 100 is made relative to the arrival time of a corresponding pulse at the clock pin 132 of memory board 100.

All vendors who adopt the present invention, that is adjusting the length of phase lock loop 200 to compensate for the length of trace 134 will have substantially equal timing of clock pulses at the various chips on the memory board 100, all timing measured relative to the arrival time of a clock pulse on the bus at memory board input pin 132.

Figure 5:
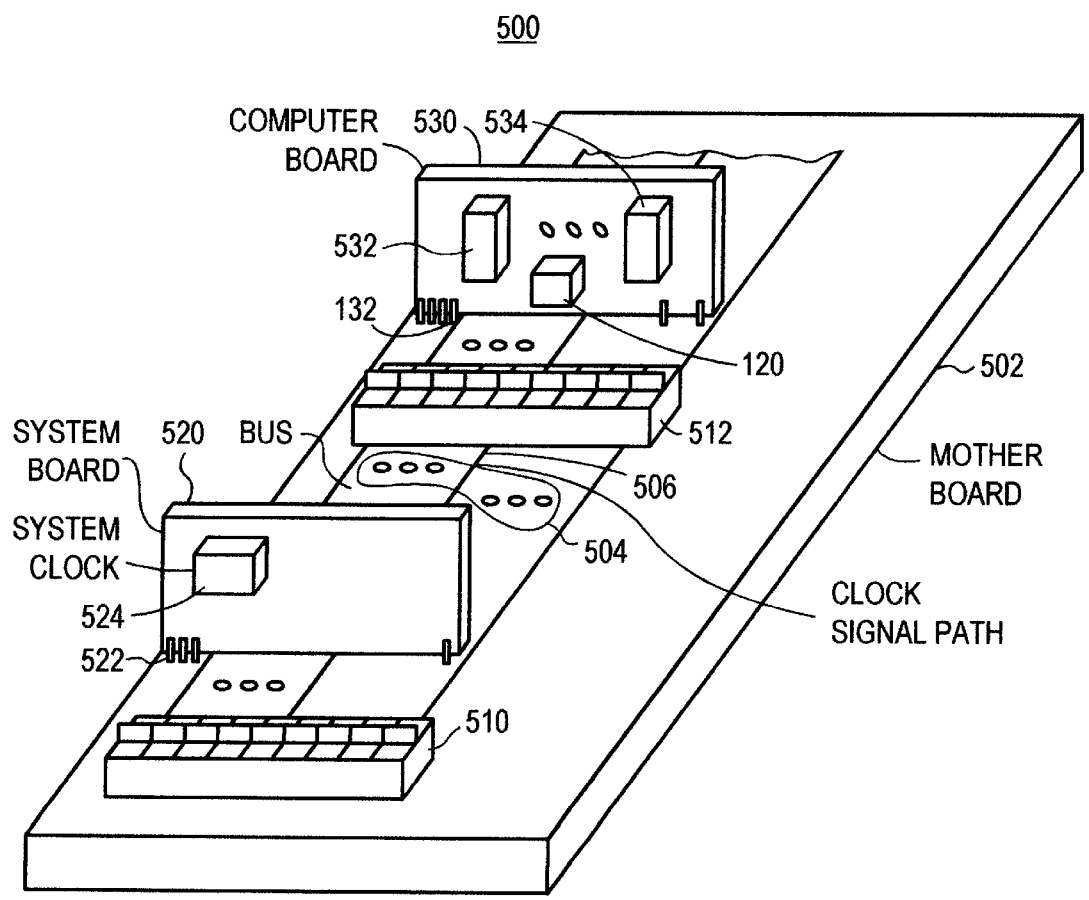
FIG. 5 is a isometric sketch of a computer mother board.

Turning now to FIG. 5, computer system 500 is shown. Computer mother board 502 has bus 504. Bus 504 may be made by, for example, etching of traces into motherboard 502, or, as a farther example, may be made of individual wires, or may be a combination of etched traces or individual wires, etc. Bus 504 has at least one clock signal path 506. Socket 510 and socket 512 are shown built into bus 504.

Computer board 520 plugs into socket 510. Pins 522 along the edge of computer board 520 engage conductors within socket 510 so as to connect electrically to traces of bus 504. Computer board 520 represents a system board, and contains the system clock 524. Clock pulses generated by system clock 524 travel on clock signal path 506. Clock signal path 506 conducts clock pulses to other sockets, for example socket 512.

Computer board 530 is a representative computer board which plugs into socket 512 in order to connect to conductors of bus 504. Computer board 530 has computer chips 532, 534, etc. mounted thereupon. Phase lock loop chip 120 receives clock pulses from clock signal path 506 through edge pin 132 of computer board 530. As shown with reference to FIG. 2 and FIG. 3, traces in computer board 530 carry clock pulses from phase lock loop chip 120 to various chips 532, 534, etc. mounted on computer board 530. For example, computer chips 532, 534, etc. may be memory chips, and computer board 530 may be a memory board for computer system 500. Phase lock loop chip 120 makes use of feedback path 200, as shown in FIG. 2 and FIG. 3 in order to deliver clock pulses at clock input pins of computer chips 532, 534, etc. (as shown, for example, in FIG. 2 and FIG. 3), relative to the arrival time of clock pulses at clock input pin 132 of computer board 530. The length of feedback path 200 of phase lock loop chip 120, as shown in FIG. 2 and FIG. 3, is computed as above, to take into account the length of trace 134 from board clock input pin 132 to clock input pin 142 of phase lock loop chip 120.

The length of feedback path 200 is computed as described hereinabove so as to account for the length of trace 134 leading from board 530 clock input pin 132, so that the arrival time of clock pulses at computer chips 532, 534, etc. is relative to the arrival is time of clock pulses at board 530 clock input pin 132.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method for determining a length of a feedback path of a phase lock loop chip mounted on a computer board to establish timing of clock pulses at a clock input pin of a computer chip mounted on said board, comprising:

connecting an edge pin of said computer board to a clock input pin of said phase lock loop chip by a connecting pathway having a first length, said edge pin of said computer board receiving clock signals from a clock line connected to a system clock for a computer in which said computer board is mounted;

connecting a clock output pin of said phase lock loop chip to a computer chip clock input pin by a second conducting pathway having a second length, said second conducting pathway to conduct clock pulses from said clock output pin of said phase lock loop chip to said clock input pin of said computer chip; and determining said length of said phase lock loop feedback path in response to both said first length and said second length to achieve a Desired Delay, said Desired Delay being a delay time interval which is desired between an arrival time of a clock pulse at said edge pin of said computer board and an arrival time of a corresponding clock pulse at said clock input pin of said computer chip.

2. The method as in claim 1, wherein said determining step further comprises:

calculating said length of said phase lock loop feedback path by the expression, $$L(PLL)=L(\text{Trace to } C \text{ chip})-(\text{Desired Delay})/(\text{Propagation Velocity})+L(\text{Trace from } C \text{ board clock input pin to } PLL \text{ clock input pin})$$

L(PLL) is said length of said phase lock loop feedback path,

L(Trace to C chip) is the length of a conducting pathway from said phase lock loop clock output pin to said clock input pin of said computer chip, Desired Delay is a delay time interval which is desired between an arrival time of a clock pulse at said edge pin of said computer board and an arrival time of a corresponding clock pulse at said clock input pin of said computer chip, Propagation Velocity is the velocity at which a pulse propagates along an electrically conducting trace on said computer board L(Trace from C board clock input pin to PLL clock input pin) is the length of a trace conducting a clock pulse from said edge pin of said computer board to said PLL chip clock input pin.

3. The method as in claim 2 further comprising:

choosing said L(Trace from C board clock input pin to PLL chip clock input pin)=1 inch, choosing said Desired Delay=600 picoseconds, choosing said Propagation Velocity=180 picoseconds/inch choosing said L(Trace to C chip)=5 inch.

4. The method as in claim 3 further comprising: determining said L(PLL)=2.67 inch.

5. The method of claim 1, further comprising: choosing said computer board as a memory board.

6. The method of claim 1, further comprising: choosing said computer chip as a memory chip.

7. A computer board having a phase lock loop chip (PLL chip), said PLL chip having a feedback path, said PLL chip to establish timing of clock pulses at a clock input pin of a computer chip mounted on said board, comprising means for connecting an edge pin of said computer board to a clock input pin of said phase lock loop chip by a connecting pathway having a first length, said edge pin of said computer board receiving clock signals from a clock line connected to a system clock for a computer in which said computer board is mounted;

means for connecting a clock output pin of said phase lock loop chip to a computer chip clock input pin by a second conducting pathway having a second length, said second conducting pathway to conduct clock pulses from said clock output pin of said phase lock loop chip to said clock input pin of said computer chip;

means for determining a Desired Delay, said Desired Delay being a delay time interval which is desired between an arrival time of a clock pulse at said edge pin of said computer board and an arrival time of a corresponding clock pulse at said clock input pin of said computer chip; and means for determining said length of said phase lock loop feedback path in response to both said first length and said second length to achieve said Desired Delay.

8. A computer board having a phase lock loop chip (PLL chip), said PLL chip having a feedback path, said PLL chip to establish timing of clock pulses at a clock input pin of a computer chip mounted on said board, comprising:

an edge pin of said computer board connected to a clock input pin of said phase lock loop chip by a connecting pathway having a first length, said edge pin of said computer board receiving clock signals from a clock line connected to a system clock for a computer in which said computer board is mounted;

a clock output pin of said phase lock loop chip connected to a computer chip clock input pin by a second conducting pathway having a second length, said second conducting pathway to conduct clock pulses from said clock output pin of said phase lock loop chip to said clock input pin of said computer chip; and said phase lock loop feedback path having a length determined in response to both said first length and said second length to achieve a Desired Delay, said Desired Delay being a delay time interval which is desired between an arrival time of a clock pulse at said edge pin of said computer board and an arrival time of a corresponding clock pulse at said clock input pin of said computer chip.

9. A computer board having a phase lock loop chip (PLL chip), said PLL chip having a feedback path, said PLL chip to establish timing of clock pulses at a clock input pin of a computer chip mounted on said board, comprising:

an edge pin of said computer board connected to a clock input pin of said phase lock loop chip by a connecting pathway having a first length, said edge pin of said computer board receiving clock signals from a clock line connected to a system clock for a computer in which said computer board is mounted;

a clock output pin of said phase lock loop chip connected to a computer chip clock input pin by a second conducting pathway having a second length, said second conducting pathway to conduct clock pulses from said clock output pin of said phase lock loop chip to said clock input pin of said computer chip; and said phase lock loop feedback path having a length determined by the expression, $$L(PLL)=L(\text{Trace to } C \text{ chip})-(\text{Desired Delay})/(\text{Propagation Velocity})+L(\text{Trace from } C \text{ board clock input pin to } PLL \text{ clock input pin})$$

L(PLL) is said length of said phase lock loop feedback path,

L(Trace to C chip) is the length of a conducting pathway from said phase lock loop clock output pin to said clock input pin of said computer chip, Desired Delay is a delay time interval which is desired between an arrival time of a clock pulse at said edge pin of said computer board and an arrival time of a corresponding clock pulse at said clock input pin of said computer chip, Propagation Velocity is the velocity at which a pulse propagates along an electrically conducting trace on said computer board, and L(Trace from C board clock input pin to PLL clock input pin) is the length of a trace conducting a clock pulse from said edge pin of said computer board to said PLL chip clock input pin.

10. A memory board having a phase lock loop chip (PLL chip), said PLL chip having a feedback path, said PLL chip to establish timing of clock pulses at a clock input pin of a memory chip mounted on said board, comprising:

an edge pin of said memory board connected to a clock input pin of said phase lock loop chip by a connecting pathway having a first length, said edge pin of said memory board receiving clock signals from a clock line connected to a system clock for a computer in which said memory board is mounted;

a clock output pin of said phase lock loop chip connected to a memory chip clock input pin by a second conducting pathway having a second length, said second conducting pathway to conduct clock pulses from said clock output pin of said phase lock loop chip to said clock input pin of said memory chip; and said phase lock loop feedback path having a length determined in response to both said first length and said second length to achieve a Desired Delay, said Desired Delay being a delay time interval which is desired between an arrival time of a clock pulse at said edge pin of said computer board and an arrival time of a corresponding clock pulse at said clock input pin of said computer chip.

11. A memory board having a phase lock loop chip (PLL chip), said PLL chip having a feedback path, said PLL chip to establish timing of clock pulses at a clock input pin of a memory chip mounted on said board, comprising:

an edge pin of said memory board connected to a clock input pin of said phase lock loop chip by a connecting pathway having a first length, said edge pin of said memory board receiving clock signals from a clock line connected to a system clock for a computer in which said memory board is mounted;

a clock output pin of said phase lock loop chip connected to a memory chip clock input pin by a second conducting pathway having a second length, said second conducting pathway to conduct clock pulses from said clock output pin of said phase lock loop chip to said clock input pin of said memory chip;

said phase lock loop feedback path having a length determined by the expression, $$L(PLL)=L(\text{Trace to } M \text{ chip})-(\text{Desired Delay})/(\text{Propagation Velocity})+L(\text{Trace from } M \text{ board clock input pin to } PLL \text{ clock input pin})$$

L(PLL) is said length of said phase lock loop feedback path,

L(Trace to M Chip) is the length of a conducting pathway from said phase lock loop clock output pin to said clock input pin of said memory chip, Desired Delay is a delay time interval which is desired between an arrival time of a clock pulse at said edge pin of said memory board and an arrival time of a corresponding clock pulse at said clock input pin of said memory chip, Propagation Velocity is the velocity at which a pulse propagates along an electrically conducting trace on said memory board, L(Trace from M board clock input pin to PLL clock input pin) is the length of a trace conducting a clock pulse from said edge pin of said memory board to said PLL chip clock input pin.

12. A method for determining a length of a feedback path of a phase lock loop chip mounted on a computer board to establish timing of clock pulses at a clock input pin of a computer chip mounted on said board, comprising:

connecting an edge pin of said computer board to a clock input pin of said phase lock loop chip by a connecting pathway having a first length, said edge pin of said computer board receiving clock signals from a clock line connected to a system clock for a computer in which said computer board is mounted;

connecting a clock output pin of said phase lock loop chip to a computer chip clock input pin by a second conducting pathway having a second length, said second conducting pathway to conduct clock pulses from said clock output pin of said phase lock loop chip to said clock input pin of said computer chip;

determining a Desired Delay, wherein said Desired Delay is a delay time interval which is desired between an arrival time of a clock pulse at said edge pin of said computer board and an arrival time of a corresponding clock pulse at said clock input pin of said computer chip; and determining said length of said phase lock loop feedback path in response to both said first length and said second length to achieve said Desired Delay.

13. A computer board having a phase lock loop chip (PLL chip), said PLL chip having a feedback path, said PLL chip to establish timing of clock pulses at a clock input pin of a computer chip mounted on said board, comprising:

an edge pin of said computer board connected to a clock input pin of said phase lock loop chip by a connecting pathway having a first length, said edge pin of said computer board receiving clock signals from a clock line connected to a system clock for a computer in which said computer board is mounted;

a clock output pin of said phase lock loop chip connected to a computer chip clock input pin by a second conducting pathway having a second length, said second conducting pathway to conduct clock pulses from said clock output pin of said phase lock loop chip to said clock input pin of said computer chip;

a Desired Delay, wherein said Desired Delay is a delay time interval which is desired between an arrival time of a clock pulse at said edge pin of said computer board and an arrival time of a corresponding clock pulse at said clock input pin of said computer chip; and said phase lock loop feedback path having a length determined in response to both said first length and said second length to achieve said Desired Delay.

* * * * *